UNITED STATES PATENT OFFICE.

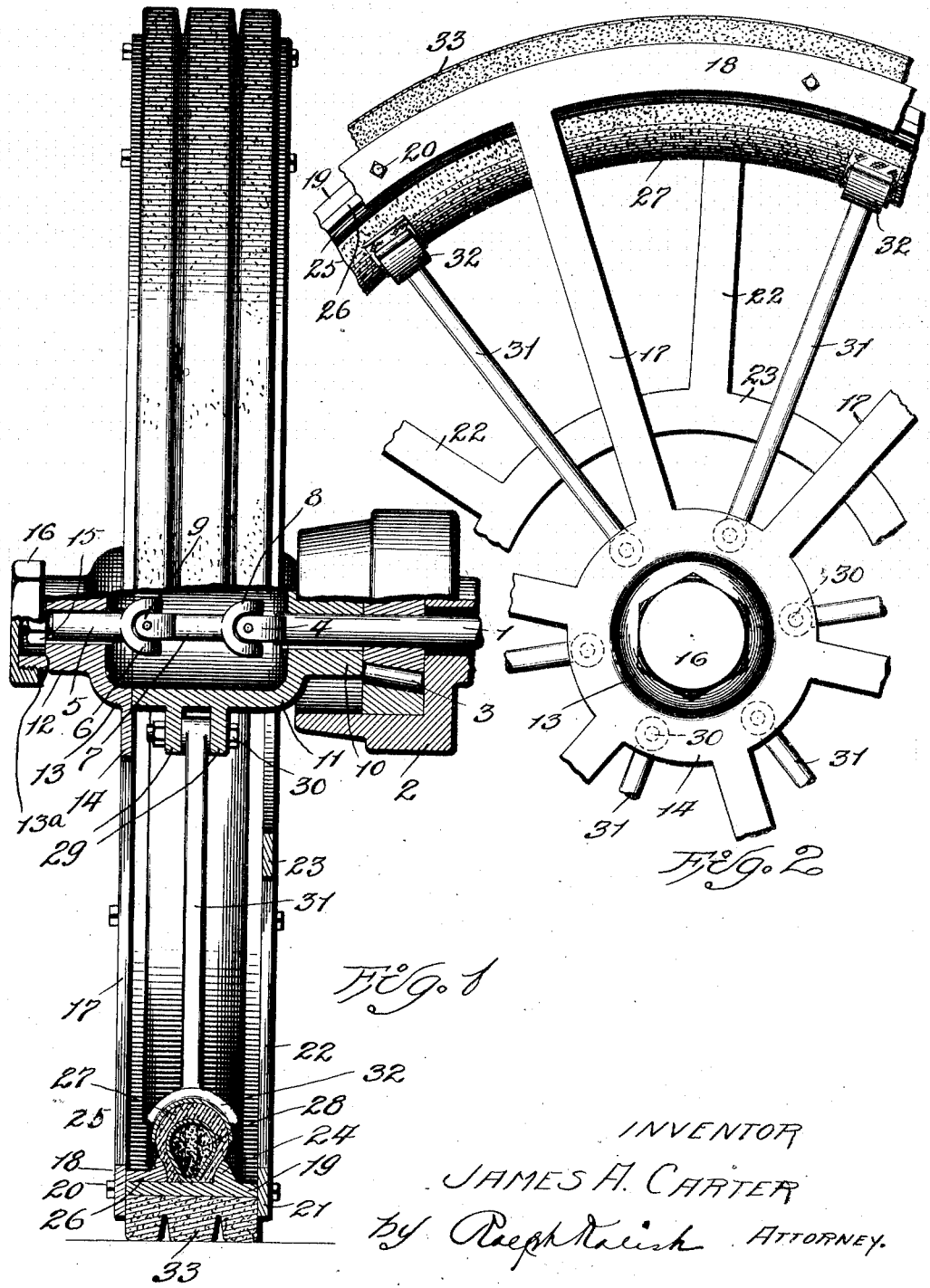

JAMES A. CARTER, OF ST. LOUIS, MISSOURI.

WHEEL AND AXLE CONSTRUCTION.

1,349,559. Specification of Letters Patent. Patented Aug. 17, 1920.

Application filed December 27, 1918. Serial No. 268,483.

*To all whom it may concern:*

Be it known that I, JAMES A. CARTER, a citizen of the United States, residing at the city of St. Louis, State of Missouri, have invented a certain new and useful Improvement in Wheel and Axle Constructions, of which the following is a specification, reference being had to the accompanying drawing forming a part thereof.

This invention relates generally to pneumatic wheels and, more especially, to a certain new and useful improvement in wheel and axle constructions for use particularly in connection with automobiles and analogous vehicles, the objects of my present invention being to provide an efficient construction for use as stated wherein an inner wheel-portion including a pneumatic tube is embraced within an outer wheel-portion including a non-puncturable ring or rim, the ring or rim surrounding and providing a seat for the pneumatic tube and constituting the thread of the wheel and a protecting armor for the tube; wherein also both outer and inner wheel-portions and the axle are connected together for synchronous rotational movement, thereby obtaining a positive drive effect on both the rim or tread and the tube, and obviating wear by abrasion between the rim or tread and the tube; and wherein further the axle is so formed as to permit movement of the outer wheel-portion relatively thereto under tread impacts or shocks, the protected tube providing an elastic cushion for supporting the weight of the vehicle and for absorbing the shocks, jars, or impacts to which the outer wheel-portion may be subjected.

With the above and other objects in view, my present invention resides in the novel features of form, construction, arrangement, and combination of parts hereinafter described and afterward pointed out in the claims.

In the accompanying drawing,

Figure 1 is a front elevational view, partly in section, of a wheel and axle construction embodying my invention; and Fig. 2 is a fragmental side elevational view of the same.

Referring to the said drawing, in which like reference characters refer to like parts throughout the several views, 1 indicates the driving-axle, which is connected as common with the transmission, not shown, and which is housed within the fixed or dead axle 2, a roller-bearing or the like 3 interposed between the axles 1 and 2 providing for free rotary movement of live axle 1. At its outer or projecting end, the axle 1 is forked, as at 4. Forming substantially a part of the axle 1, is an extension 5 forked at its inner end, as at 6. Connecting axle 1 and its extension 5, and interposed longitudinally therebetween, is a link 7 oppositely forked at its ends, as at 8—9, the forked ends 8 and 9 of the link 7 being operatively positioned relatively to the forked ends 4 and 6 of axle 1 and its extension 5, respectively, and which forks 4, 6, 8, and 9 are suitably pinned or otherwise fastened together for relative universal movement. The link 7 and its described connections with the axle proper 1 and its extension 5 thus provide a universal joint between the axle 1 and its extension 5, axle-extension 5 being not only rotatably movable with the axle 1, but also movable laterally relatively thereto.

Keyed or otherwise fastened at a reduced bored portion 10 to rotate with axle 1, is an open-end chambered hub-member 11 of a width axially to substantially house therein the universal-joint link 7, as seen in Fig. 1. And keyed or otherwise fastened at a reduced outer bored-portion 12 to rotate with axle-extension 5 and consequently also with axle 1, is a hub-member 13 of a form to neatly separably abut at its inner end against, and complement, the main hub-member 11, as also seen in Fig. 1, hub-member 13 being preferably integrally provided at its inner end with an outwardly presented annular flange 14. At its outer end, hub-member 13 is recessed, as at 13$^a$, to provide a pocket for a nut 15, which is threaded upon axle-extension 5 to retain the hub-members 11 and 13 operatively together and upon the axle, an end covering-cap 16 being preferably threaded upon the hub-member, as shown.

Radiating from, and preferably integral at their inner end with, the hub-flange 14, are rigid spokes 17, which at their outer end are integral with, or otherwise rigidly fixed to, a ring 18. This ring 18 is disposed flatwise relatively to one edge of a relatively broad ring 19, to which ring 19 the spoke-ring 18 is bolted or otherwise detachably fastened, as by securing-bolts or the like 20, the ring 19 being preferably flat upon its outer face and being adapted to provide the rim of the outer wheel-portion of the structure. Also bolted or otherwise fixed to the opposite edge of the rim 19, is a reinforcing spider comprising an outer ring 21, radial spokes 22, and an inner ring 23 surrounding, but spaced from, the hub-member 11, as shown.

On the inner face, the rim 19 is provided preferably integrally with an annular lug or tire-engaging member 24, coöperating with which to provide a seat for a pneumatic tubular cushion, is a corresponding lug or tire-engaging member 25 forming part of a ring 26 seated for removal upon the inner face of the rim 19, the ring 18 serving also as a retaining member for the ring 26.

Demountably engaged by the lugs or tire-engaging members 24 and 25, are the ends of a split pneumatic casing 27 extending around within the rim 19, the casing 27 being adapted to contain an inner inflatable tube 28 as in the usual pneumatic tire.

Carried by the hub-member 11, at an approximate median point axially of the wheel, is a pair of outstanding flanges 29—29, which are relatively spaced and parallel and through which are formed axially alined apertures arranged to receive pivot-bolts 30 carrying outwardly projecting spokes 31, each spoke 31 being provided at its outer, free end with a yoke 32 adapted to operatively engage the pneumatic-cushion 27.

In use or operation, it will be noted that, while both the other wheel-portion including the rim 19 and the inner wheel-portion including the pneumatic-cushion 27 rotate with the axle 1 and its extension 5, the outer wheel-portion, under road-impacts, shocks, jars, and the like, is free, through its separate hub-member 13, axle-extension 5, and universal joint 7, to move relatively to the main axle or axle proper 1, such impacts, shocks, jars, and the like being absorbed by, and the vehicle being cushioned relatively thereto, by the pneumatic-tube 27 of the inner wheel-portion, which tube is at the same time protected from punctures and wear by the tread-rim 19.

Seated upon the outer face of the rim 19 and retained by the side rings 18 and 21, is an annular cushion of solid rubber or the like 33 adapted to cushion the wheel and obviate side slippage thereof upon the roadway.

I am aware that minor changes in the form, construction, arrangement, and combination of the several parts of my new wheel and axle construction may be made and substituted for those herein shown and described without departing from the nature and principle of my invention.

Having thus described my invention, what I claim and desire to secure by Letters Patent is:

1. In an axle and wheel construction, a main axle, an axle-extension, a joint connecting the main axle and the axle-extension, whereby the axle-extension is movable both with and universally relatively to the main axle, an inner wheel-portion mounted upon the main axle and including a hub-member and an annular cushion, and an outer wheel-portion mounted upon the axle extension and including a hub-member and an annular rim, said hub-members being adapted to complementingly house said joint and the cushion of the inner wheel-portion being disposed within the rim of the outer wheel-portion.

2. In an axle and wheel construction, a main axle, an axle-extension, a joint connecting the main axle and the axle-extension, whereby the axle-extension is movable both with and universally relatively to the main axle, an inner wheel-portion mounted upon the main axle and including a hub-member, an annular cushion, and spokes fastened to the hub-member and engaging the cushion, and an outer wheel portion mounted upon the axle-extension and including a hub-member, an annular rim, and rigid connecting spokes therebetween, said hub-members being adapted to complementingly house said joint and the cushion of the inner wheel portion being disposed within the rim of the outer wheel portion.

In testimony whereof I have signed my name to this specification.

JAMES A. CARTER.